United States Patent
Wang

[11] Patent Number: 5,924,353
[45] Date of Patent: *Jul. 20, 1999

[54] DURABLE OIL WELL PUMP OF FITTING CERAMICS CYLINDER

[76] Inventor: De Qing Wang, No. 3 Beixing, Yude Lane, Pinganli, Xicheng District, Beijing 100035, China

[*] Notice: This patent issued on a continued prosecution application filed under 37 CFR 1.53(d), and is subject to the twenty year patent term provisions of 35 U.S.C. 154(a)(2).

[21] Appl. No.: 08/757,478

[22] Filed: Nov. 27, 1996

[30] Foreign Application Priority Data

Dec. 15, 1995 [CN] China ............... 95 2 28715.3

[51] Int. Cl.⁶ ............................ F16J 10/04
[52] U.S. Cl. ............ 92/170.1; 92/151; 92/146; 417/554
[58] Field of Search ............... 417/552, 554; 92/151, 170.1, 146, 248

[56] References Cited

U.S. PATENT DOCUMENTS

| | | | |
|---|---|---|---|
| 837,266 | 11/1906 | Gallagher | 417/554 |
| 1,027,665 | 5/1912 | Parker | 92/170.1 |
| 1,184,018 | 5/1916 | Rathburn | 417/554 |
| 1,545,474 | 7/1925 | Adams | 417/554 |
| 1,603,675 | 10/1926 | Folsom et al. | 417/554 |
| 4,572,056 | 2/1986 | Funke | 92/170.01 |
| 4,596,515 | 6/1986 | Simon et al. | 417/552 |
| 4,720,247 | 1/1988 | Strickland et al. | 417/392 |
| 4,746,554 | 5/1988 | Ecer | 427/191 |
| 5,141,416 | 8/1992 | Cognevich et al. | 92/248 |
| 5,417,281 | 5/1995 | Wood et al. | 417/406 |
| 5,628,625 | 5/1997 | Dokas | 92/72 |

OTHER PUBLICATIONS

Rogers data sheet; Internet address (http://www.rogers-corp.com/mwu/6010.htm), <1996.

Fiber Glass Systems, Inc. home page; Internet address (http://www.onr.com/star/products.htm, <1996.

*Primary Examiner*—Timothy S. Thorpe
*Assistant Examiner*—Cheryl J. Tyler
*Attorney, Agent, or Firm*—Smith, Gambrell & Russell, LLP; Beveridge, DeGrandi, Weilacher & Young Intellectual Property Group

[57] ABSTRACT

A durable oil well pump having fitted ceramic cylinders. Two metal retainers are fitted at two ends of the ceramic liner barrels. A cement or adhesive, which is resistant to pressure and temperature is placed in the annular clearance among the liner barrels, the retainers and an outer tube. There are multiple segmented plunger skirt and ceramic barrels to be fitted around a plunger inner tube. The valve seat outer ring is shrunk on to the ceramic inner ring. The valve ball is also made of ceramic. This pump has resistance to corrosion, temperature and magnetic fields. This pump can prevent liner barrel displacement, increase the period between repair, improve oil production, and reduce the cost of production.

10 Claims, 4 Drawing Sheets

FIG. 2A
FIG. 2B
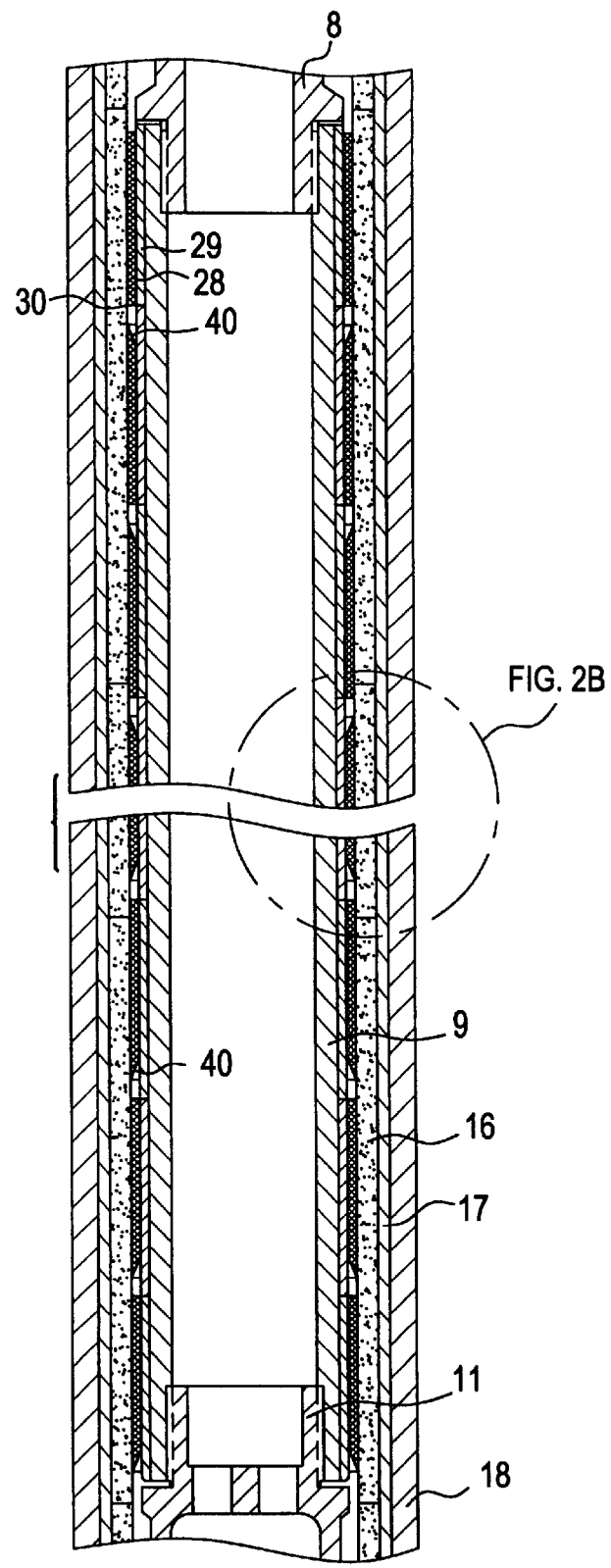
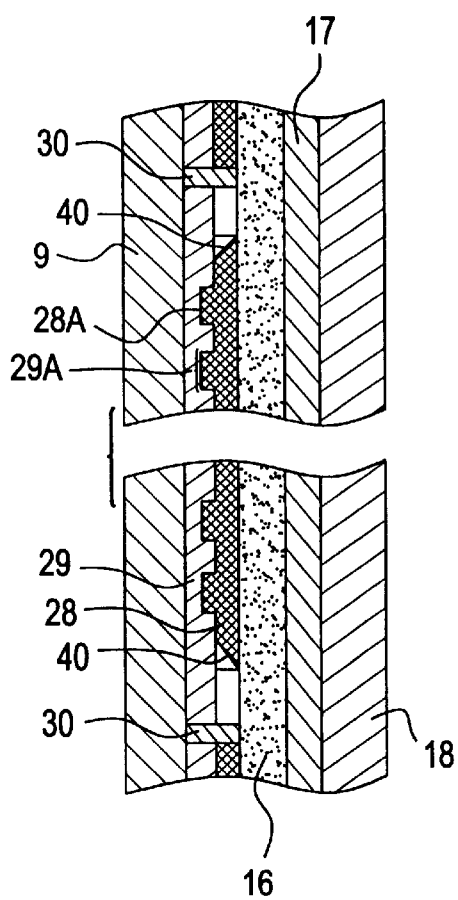

FIG. 5
FIG. 4
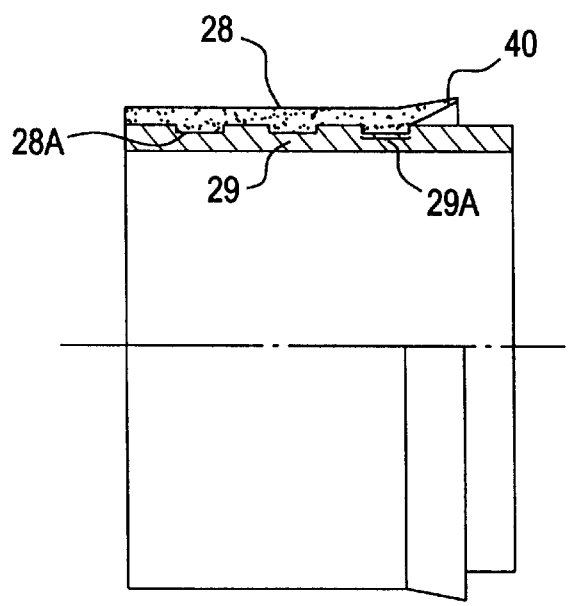
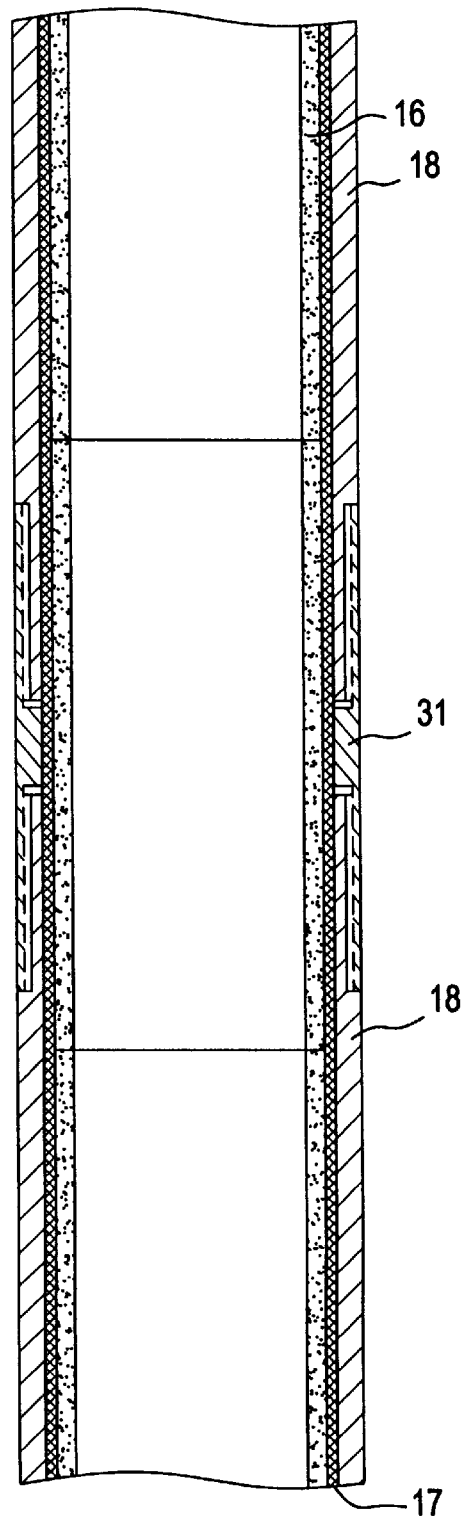

DURABLE OIL WELL PUMP OF FITTING CERAMICS CYLINDER

FIELD OF THE INVENTION

This invention relates to an oil well pump. In particular, this invention relates to a rod type oil well pump, which is used to pump oil in secondary oil recovery.

BACKGROUND OF THE INVENTION

An oil well pump is an important constituent part of a pumping unit. Current oil well pumps usually have many segmented cylindrical metal barrels fitted in an outer tube and fixed by a cover at each end of the outer tube. A plunger is provided having a hollow barrel shape. A check valve is provided including a valve cover, a valve ball, and a valve seat. A pumping rod is connected to an upper valve cover and drives the plunger in a reciprocating motion, and when the plunger is in an up stroke, oil flows into the cylinder through a filter and the check valve. When the plunger is in a down stroke, the check valve at the bottom will be closed, and oil flows into an oil tube through a check valve to be lifted to the surface. A set of mandrels positions the cylinder to keep the segmented metal liner barrels co-axial. Then the cylinder is fixed in an outer tube by a sealing head at each end. There is some clearance between the liner barrels and the outer tube for convenience to adjust the positioning mandrels and the liner barrels. In order to prevent displacement of the liner barrels, when the positioning mandrels are removed, the upper sealing head and lower sealing head must be fastened down. In conventional practice, sometimes due to transport or disconnection of the pump, displacement of the liner barrels occurs, and the pump does not work normally. Although the liner barrels and the plunger have a hardened surface, there is friction between them causing them to wear. The presence of sand and hydrogen sulfide in the oil well will especially aggravate wear and corrosion. If the pump requires repair, the pump must be lifted from thousands of meters down the oil well, and a spare oil well pump will be set in. Not only is the replacement difficult, but it also is expensive. During the period of repairing, oil production will be decreased and the cost of oil production will be increased.

SUMMARY OF THE INVENTION

It is one objective of this invention to provide a durable oil well pump with fitting ceramic cylinders. The liner barrel is made of ceramics, which prevents displacement. The structure of the plunger and the check valve are improved. Wear resistance, temperature resistance, magnetic resistance, and corrosion resistance of this pump will be prominently increased, and the period between repairs will be extended, thereby reducing the cost of oil production.

This invention includes the following components:

1. A plurality of segmented ceramic liner barrels are fitted in an outer tube. Each liner barrel is made of ceramics that have the following properties: super hardness, wear resistance, temperature resistance, and corrosion resistance. A mandrel is positioned in the liner barrels. An adhesive or cement that is temperature resistant, pressure resistant, oil proof, and expandable is filled in an annular clearance or gap between the liner barrels, retainers, and the outer tube. After positioning, the mandrel will be taken out after the liner barrels, retainers, and outer tube are fixed together. Two retainers are installed, one at each end of the liner barrels, for convenience to fit the plunger into the cylinder. The cylindrical body of the structure will increase its capability of resisting tension and resisting wear.

2. The plunger includes a plunger inner tube, plunger barrels, and plunger skirt barrels. The segmented ceramic plunger barrels and plunger skirt barrels are fitted around the plunger inner tube. The plunger skirt barrels include plunger inner skirt barrels and plunger outer skirt barrels. The plunger inner skirt barrel is made of metal with annular grooves on its outer periphery for preventing the plunger outer skirt barrel from axially displacing. The material of the plunger outer skirt barrel includes polytetrafluoroethylene and ceramic powder. The plunger inner skirt barrel and the plunger outer skirt barrel will be formed with pressure and heat.

3. The check valve includes a valve ball and a valve seat. The valve ball is made of ceramics, while the valve seat includes a metal valve seat outer ring and a ceramic valve seat inner ring. The outer ring is shrunk around the inner ring.

This improved oil well pump has the following advantages:

1. The liner barrel is made of ceramics with the following properties: super hardness, wear resistance, high temperature resistance, magnetic resistance, and corrosion resistance. As compared and contrasted with existing pumps with many augment barrels, the present invention is a composite rigid cylindrical tube with liner barrels fixed with adhesive or cement preventing displacement during transport or disconnection of the pump. This pump is particularly suited for long stroke and large capacity oil wells.

2. The structure of the plunger skirt barrel provides the pump with automatic compensation for wearing and improved sealing. Depending on the amount of sand present in an oil well, there are three structures for the plunger as shown in FIGS. 1–4. The plunger has the properties of wear resistance, corrosion resistance, magnetic resistance, and temperature resistance.

3. The valve ball and the valve seat inner ring are made of ceramics. The structure of the valve seat is a metal valve seat outer ring shrunk on to the ceramic valve seat inner ring. The valve seat has the following properties: wear resistance, temperature resistance, corrosion resistance, magnetic resistance, and impact resistance.

BRIEF DESCRIPTION OF THE DRAWINGS

FIGS. 2A and 2B are cross-sectional and enlarged views of a second embodiment of the plunger structure and the skirt barrels, respectively, according to the invention.

FIG. 4 is a cross-sectional view of the plunger skirt barrel.

FIG. 5 is a cross-sectional view of the long stroke cylinder.

BEST MODE FOR CARRYING OUT THE INVENTION

The
following is a description of the preferred embodiments of the present invention with respect to the attached drawings.

Figure 1A:
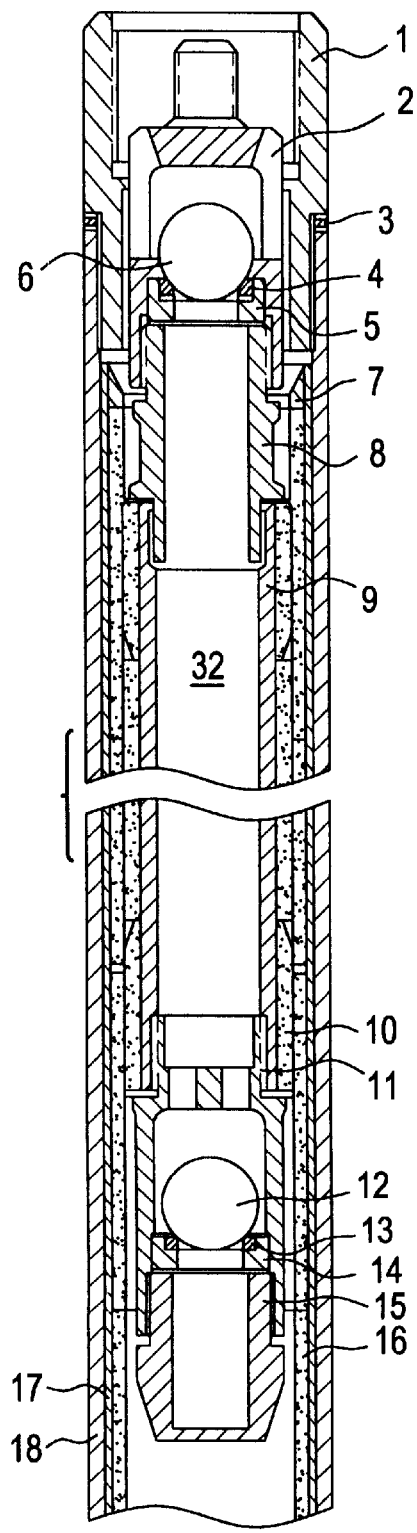
FIGS. 1A and 1B are cross-sectional views of the structure of a durable oil well pump according to one embodiment of the invention.
Figure 1B:
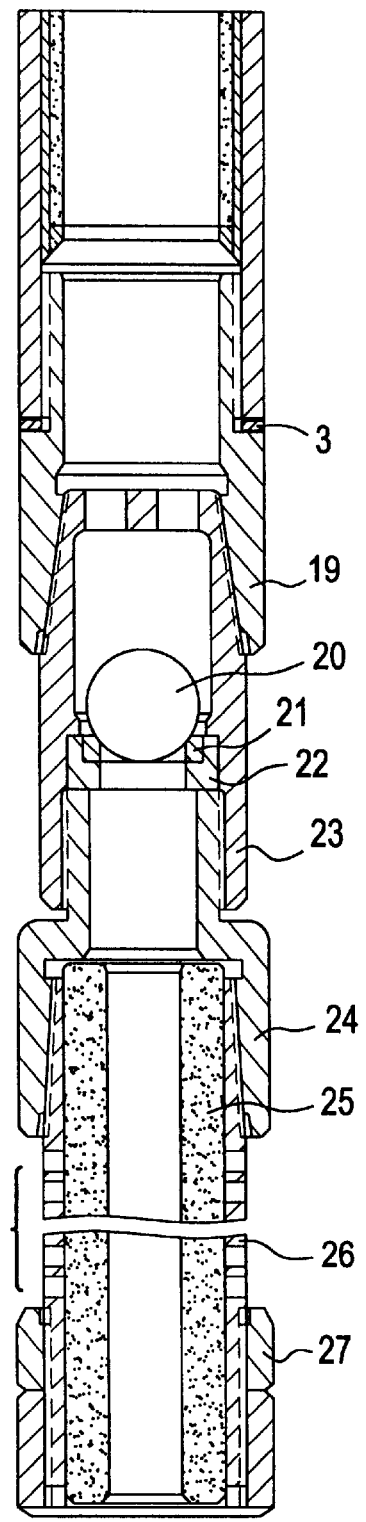

Referring
to FIGS. 1A and 1B, the cylinder of the pump
is fixed with adhesive or cement 17, which is filled between ceramic liner barrels 16, retainers 7, and the outer tube 18. There are two washers 3 at the opposite ends of the outer tube 18, and the outer tube 18 is topped by an upper sealing head 1. The lower end of the outer tube 18 is connected to a lower sealing head 19 at a washer 3. The washers 3 may be made from a composite of polytetrafluoroethylene and ceramic powder. The plunger 32 includes a plunger barrel 10 that is fixed on the plunger inner tube 9 with an adhesive or cement having the properties of temperature resistance, pressure resistance, and oil resistance. Adapter 8 is connected with check valve cover 2 at one end of the plunger 32. Another check valve cover 11 is connected with another adapter 15 at the opposite end of the plunger 32. Valve cover 23 is connected with adapter 24 at one end of the cylinder. Each check valve respectively includes a valve ball 6, 12, and 20 and a valve seat (which is explained in more detail below), and each is fitted in a valve cover 2, 11, and 23. Each valve seat respectively includes a valve seat outer ring 5, 14, and 22 and a ceramic valve seat inner ring 4, 13, and 21. Each valve seat outer ring 5, 14, and 22 is shrunk on to a respective valve seat inner ring 4, 13, and 21. Each ceramic valve ball 6, 12, and 20 is fitted on its respective valve seat. A filter unit includes a filter element 25, a strainer 26, and an end cap 27. The filter unit is connected with adapter 24.

One type of plunger structure 32 is shown in FIGS. 2A and 2B.

The plunger inner skirt barrel 29 (see also FIG. 4) and the plunger outer skirt barrel 28 are fixed together with pressure and heat. One end of the plunger outer skirt barrel 28 is skirt shaped 40 to act as a plunger seal. Plunger outer skirt barrels 28 are divided into two types, each of which is mounted on the plunger inner tube 9 via the plunger inner skirt barrel 29. On one type of the plunger outer skirt barrel 28, the skirt part 40 faces up, and on the other type, the skirt part 40 faces down (see FIGS. 2A and 2B). As shown in FIGS. 2A and 2B, a separator 30 helps position the plunger skirt barrels 28 and 29 around the plunger inner tube 9.

Figure 3:
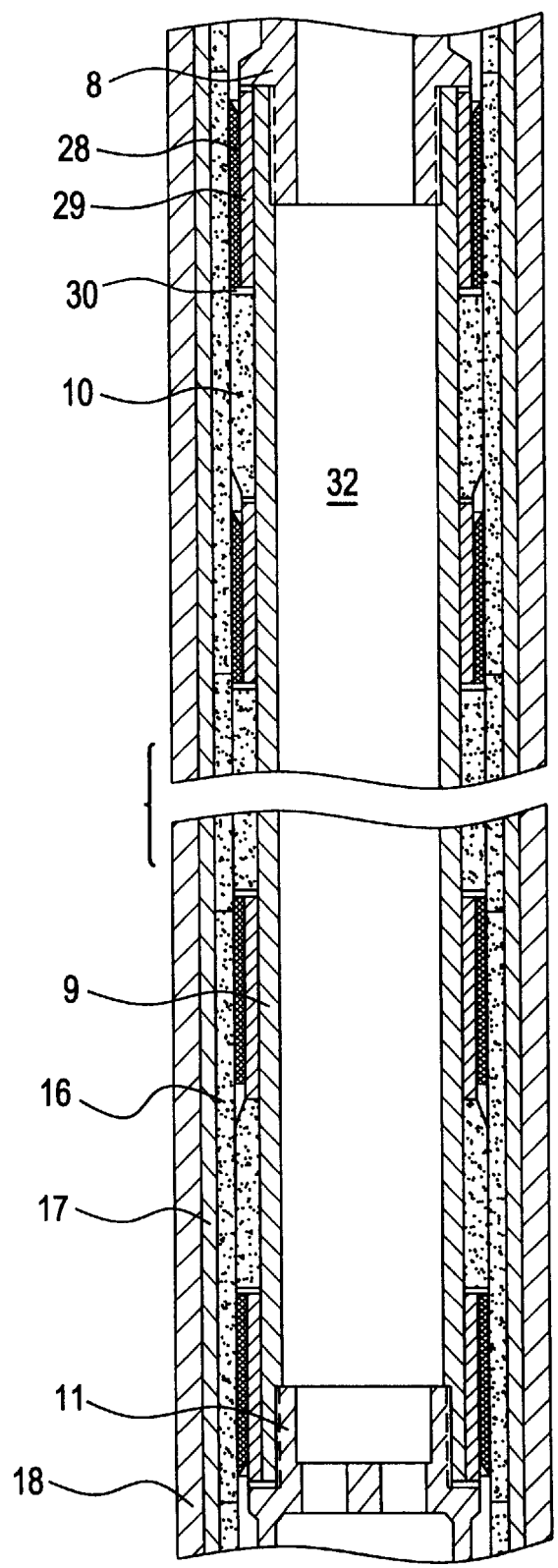
FIG. 3 is a cross-sectional view of a third embodiment of the plunger structure according to the invention.

Another type of plunger structure 32 is shown in FIG. 3.

This type of plunger 32 is for use in oil wells with sand present. The ceramic plunger barrels 10 and the plunger inner skirt barrels 29 are mounted on the plunger inner tube 9. One ceramic plunger barrel 10 is provided, and then a plunger inner skirt barrel 29 is provided, in an alternating manner, as shown in FIG. 3. Each plunger inner skirt barrel 29 is accompanied with a plunger outer skirt barrel 28. Also, as shown in FIG. 3, a separator 30 helps position plunger skirt barrels 28 and 29 around the plunger inner tube 9 and separate them from the alternating ceramic plunger barrel portions 10.

Another type of plunger structure 32 is shown in FIG. 1.

If a large amount of sand is present in an oil well, the plunger is fitted with all ceramic plunger barrels 10.

The plunger skirt barrel structure is shown in more detail in FIG. 4.

The plunger skirt barrel structure includes a plunger inner skirt barrel 29 made of metal with annular grooves 29A in its outer periphery. The plunger outer skirt barrel 28 is made from a material that includes polytetrafluoroethylene and ceramic powder. As shown in FIG. 4, the inner periphery of the plunger outer skirt barrel 28 includes engagement portions 28A that engage with the annular grooves 29A of the plunger inner skirt barrel 29 such that the plunger inner skirt barrel 29 and the plunger outer skirt barrel 28 concentrically fix together to form the plunger barrel skirt. The plunger inner skirt barrel 29 and the plunger outer skirt barrel 28 are fixed together with pressure and/or heat.

A long stroke cylinder is shown in FIG. 5.

In order to increase oil production, two or more outer tubes 18 of a short stroke pump are connected by a collar 31, to adopt a mandrel position, and adhesive or cement 17 is filled between the ceramic liner barrels 16 and the outer tube 18 to fix them. The pump cylinder of long stroke and large capacity will be formed by a series of outer tubes 18.

In operation, the plunger 32, including the plunger inner tube 9, plunger barrels 10, and plunger skirt barrels 28 and 29 (if present, as in the embodiments of FIGS. 2A, 2B, and 3), slides along the liner barrels 16 of the cylinder, in an up stroke and a down stroke, to pump oil in a known manner, as generally described above in the Background portion of this specification.

I claim:

1. An arrangement for a pump, comprising:
   an outer housing including:
      an elongated outer tube having an inner periphery, and
      a plurality of segmented outer tube barrel liners each attached concentrically to said inner periphery of said elongated outer tube such that inner peripheries of said outer tube barrel liners together define at least a substantial portion of a plunger chamber; and
   a plunger slidably received in said plunger chamber, the plunger including:
      an elongated inner tube having an outer periphery and opposite ends,
      a plurality of segmented plunger barrel liners each attached concentrically to said outer periphery of said inner tube in an elongated alignment, wherein outer peripheries of said plunger barrel liners together form an exterior sliding surface, said exterior sliding surface being in sliding engagement with said inner peripheries of said outer tube barrel liners, and
      first and second valve mechanisms operatively coupled, respectively, to said opposite ends of said inner tube,
   wherein said outer tube barrel liners are formed from a ceramic material and are at least partially attached to said outer wall with an adhesive resistant to pressure and temperatures and non-reactive with oil.

2. The arrangement defined in claim 1, wherein:
   said plunger barrel liners are formed from a ceramic material.

3. The arrangement defined in claim 2, wherein:
   at least one of said plunger barrel liners includes a plunger barrel skirt, wherein an outer periphery of said plunger barrel skirt includes at least one skirt portion extending radially therefrom.

4. The arrangement defined in claim 3, wherein:
   said skirt portion circumferentially extends about said plunger barrel skirt.

5. The arrangement defined in claim 3, wherein:
   each plunger barrel liner includes a skirt portion.

6. The arrangement defined in claim 3, wherein:
   said plunger barrel liners including said plunger barrel skirts are alternately disposed between ceramic plunger barrel liners not having a skirt portion.

7. The arrangement defined in claim 3, wherein:

said plunger barrel liners include at least two plunger barrel liners having plunger barrel skirts, wherein said skirt portions of said two plunger barrel skirts face in opposite directions.

8. The arrangement defined in claim 3, wherein:

said plunger barrel skirt includes an inner barrel and an outer barrel, said inner barrel having annular grooves defined in an outer periphery thereof, said outer barrel having an inner periphery and an outer periphery, said inner periphery having an engagement portion defined thereabout, said engagement portion formed in fixed engagement with said annular grooves of said inner barrel such that said inner barrel and said outer barrel are concentrically fixed to form said plunger barrel skirt, and said outer periphery of said outer barrel containing said skirt portion of said skirt barrel.

9. The arrangement defined in claim 1, wherein:

said first and said second valve mechanisms each include a valve ball formed of a ceramic material, an outer valve seat formed of a metallic material and an inner valve seat formed of a ceramic material, said outer valve seat being formed about said inner valve seat to form a composite valve seat.

10. The arrangement defined in claim 9, wherein:

said outer valve seat is formed about said inner valve seat by shrinking said outer valve seat about said inner valve seat.

* * * * *